United States Patent
Podgorski et al.

(10) Patent No.: US 10,240,466 B2
(45) Date of Patent: Mar. 26, 2019

(54) FIBER PREFORM FOR A HOLLOW TURBINE ENGINE VANE

(71) Applicants: SAFRAN AIRCRAFT ENGINES, Paris (FR); SAFRAN, Paris (FR)

(72) Inventors: Michael Podgorski, Paris (FR); Bruno Jacques Gerard Dambrine, Le Chatelet en Brie (FR); Son Le Hong, Thomery (FR); Dominique Marie Christian Coupe, Le Haillan (FR); Ludovic Edmond Camille Molliex, Brunoy (FR); Jonathan Goering, York, ME (US)

(73) Assignees: SAFRAN AIRCRAFT ENGINES, Paris (FR); SAFRAN, Paris (FR)

( * ) Notice: Subject to any disclaimer, the term of this patent is extended or adjusted under 35 U.S.C. 154(b) by 351 days.

(21) Appl. No.: 15/031,563

(22) PCT Filed: Oct. 3, 2014

(86) PCT No.: PCT/US2014/059051
§ 371 (c)(1),
(2) Date: Apr. 22, 2016

(87) PCT Pub. No.: WO2015/061024
PCT Pub. Date: Apr. 30, 2015

(65) Prior Publication Data
US 2016/0273372 A1    Sep. 22, 2016

(30) Foreign Application Priority Data
Oct. 23, 2013 (FR) ...................................... 13 60339

(51) Int. Cl.
*F01D 9/02* (2006.01)
*B29C 53/02* (2006.01)
(Continued)

(52) U.S. Cl.
CPC ................ *F01D 9/02* (2013.01); *B29B 11/16* (2013.01); *B29C 53/02* (2013.01); *B29C 53/04* (2013.01);
(Continued)

(58) Field of Classification Search
CPC ... F01D 9/02; F01D 9/04; F01D 9/041; F01D 9/042; F01D 25/005; F01D 5/28;
(Continued)

(56) References Cited

U.S. PATENT DOCUMENTS 7,600,978 B2 * 10/2009 Vance ...................... F01D 5/147
416/230
2002/0076541 A1 * 6/2002 Jarmon .................. C04B 35/806
428/312.6

(Continued)

FOREIGN PATENT DOCUMENTS

EP    1 777 063 A1    4/2007
EP    2 181 974 A1    5/2010
(Continued)

OTHER PUBLICATIONS

International Search Report dated Dec. 15, 2014 in PCT/US2014/059051 filed Oct. 3, 2014.
(Continued)

*Primary Examiner* — Richard Edgar
*Assistant Examiner* — Elton Wong
(74) *Attorney, Agent, or Firm* — Oblon, McClelland, Maier & Neustadt, L.L.P.

(57) ABSTRACT

A fiber preform for a hollow turbine engine vane, the preform including a main fiber structure obtained by three-dimensional weaving and including at least one main part, wherein the main part extends from a first link strip, includes a first main longitudinal portion forming a pressure side wall of an airfoil, an U-turn bend portion forming a leading edge
(Continued)

or a trailing edge of the airfoil, a second main longitudinal portion facing the first main longitudinal portion and forming a suction side wall of the airfoil, and terminating at a second link strip. The first and second link strips are secured to each other and form a link portion of the main fiber structure. The main longitudinal portions are spaced apart so as to form a gap between the main longitudinal portions forming a hollow in the airfoil.

14 Claims, 7 Drawing Sheets

(51) Int. Cl.
| | |
|---|---|
| *B29C 53/04* | (2006.01) |
| *B29C 70/54* | (2006.01) |
| *F01D 25/00* | (2006.01) |
| *D03D 3/02* | (2006.01) |
| *C04B 35/80* | (2006.01) |
| *F01D 9/04* | (2006.01) |
| *B29C 70/24* | (2006.01) |
| *B29C 70/48* | (2006.01) |
| *B29B 11/16* | (2006.01) |
| *B29C 69/00* | (2006.01) |
| *B29L 31/08* | (2006.01) |

(52) U.S. Cl.
CPC ............ *B29C 69/001* (2013.01); *B29C 70/24* (2013.01); *B29C 70/48* (2013.01); *B29C 70/545* (2013.01); *B29C 70/546* (2013.01); *C04B 35/80* (2013.01); *D03D 3/02* (2013.01); *F01D 9/041* (2013.01); *F01D 25/005* (2013.01); *B29K 2713/00* (2013.01); *B29L 2031/08* (2013.01); *C04B 2235/3217* (2013.01); *C04B 2235/3244* (2013.01); *C04B 2235/3418* (2013.01); *C04B 2235/3463* (2013.01); *C04B 2235/3826* (2013.01); *C04B 2235/3873* (2013.01); *C04B 2235/5216* (2013.01); *F05D 2220/30* (2013.01); *F05D 2220/32* (2013.01); *F05D 2230/10* (2013.01); *F05D 2230/21* (2013.01); *F05D 2230/50* (2013.01); *F05D 2300/21* (2013.01); *F05D 2300/2112* (2013.01); *F05D 2300/6012* (2013.01); *F05D 2300/6033* (2013.01); *F05D 2300/6034* (2013.01); *Y02T 50/672* (2013.01); *Y02T 50/673* (2013.01)

(58) Field of Classification Search
CPC ......... F01D 5/282; B29B 11/16; B29C 70/42; B29L 2031/3076; B29K 2309/02; B29K 2309/04; D03D 25/005; D03D 3/02; Y10T 442/3195–442/3211
USPC .................................................. 442/205–207
See application file for complete search history.

(56) References Cited

U.S. PATENT DOCUMENTS

| | | | |
|---|---|---|---|
| 2007/0092379 A1 | 4/2007 | Coupe et al. | |
| 2010/0109209 A1 | 5/2010 | Pasquero et al. | |
| 2011/0293828 A1* | 12/2011 | Eberling-Fux | .......... B29B 11/16 427/249.2 |
| 2011/0318513 A1* | 12/2011 | Marsal | ................... B29B 11/16 428/35.7 |
| 2012/0267039 A1* | 10/2012 | Dambrine | ............... B29C 70/48 156/148 |

FOREIGN PATENT DOCUMENTS

| | | | | |
|---|---|---|---|---|
| FR | 2 940 173 A1 | 6/2010 | | |
| FR | 2950286 A1 * | 3/2011 | ............ | B29C 70/48 |
| FR | 2 985 928 A1 | 7/2013 | | |
| WO | 2013/079860 A1 | 6/2013 | | |

OTHER PUBLICATIONS

French Search Report dated Jul. 15, 2014 in FR 1360339 filed Oct. 23, 2013.

* cited by examiner

FIBER PREFORM FOR A HOLLOW TURBINE ENGINE VANE

FIELD OF THE INVENTION

The present description relates to a fiber preform for a hollow turbine engine vane, to such a hollow vane, and also to a method of fabricating such a hollow vane. The invention also relates to a turbine engine and to an aircraft including such a hollow vane.

Such a preform may be used for fabricating a hollow vane, e.g. a turbine rear vane, or a vane for some other module in a turbine engine.

STATE OF THE PRIOR ART

Because of the high costs of fuel, a large amount of work is currently being undertaken to reduce the fuel consumption of aircraft turbojets. A major factor having an influence on their fuel consumption is the weight of the aircraft and of its equipment, which equipment includes the turbojets themselves.

Thus, for several years, new materials have appeared in aircraft turbojets and have enabled significant weight reductions to be obtained. This applies in particular to composite materials that provide good mechanical strength and low weight compared with the metal materials that have conventionally been used: new generations of turbojets thus have a large number of parts made out of such composite materials.

Another approach for obtaining weight reductions seeks to simplify the shapes of certain parts or to eliminate certain elements that are superfluous. In particular, it is possible to hollow out certain parts that have conventionally been solid in the past. This applies in particular to certain vanes, in particular turbine rear vanes, that are hollow in new generations of turbine engines. This makes it possible in particular to select materials that are better at withstanding the high temperatures that exist in the turbine, even if they are a little heavier than conventional materials, but without leading to an increase in weight. In addition, such a hollow vane can be used as a passage for services or cooling air.

Under such circumstances, it should theoretically be possible to combine the advantages provided by both methods of reducing weight by making such hollow vanes out of composite materials. Nevertheless, methods of fabricating hollow parts out of composite materials are few in number, complex, and not very satisfactory.

In particular, one known method consists in weaving a plurality of two-dimensional fabrics, in shaping them by stacking them, and then in bonding them together by co-sintering. Nevertheless, that method requires a large number of fabrics to be woven, leads to difficulties during joint shaping of the fabrics in the stacks, and leads to parts that suffer from structural weaknesses caused by their laminated structure There therefore exists a real need for a fiber preform for a hollow turbine engine vane, for such a hollow vane, and also for a method of fabricating such a hollow vane, while avoiding, at least in part, the drawbacks inherent to the above-mentioned known methods.

SUMMARY OF THE INVENTION

The present description provides a fiber preform for a hollow turbine engine vane, the preform comprising a main fiber structure obtained by three-dimensional weaving and including at least one main part, wherein the main part extends from a first link strip, includes a first main longitudinal portion suitable for forming essentially a pressure side wall of an airfoil, then includes a U-turn bend portion suitable for forming essentially a leading edge or a trailing edge of the airfoil, then includes a second main longitudinal portion facing the first main longitudinal portion and suitable for forming essentially a suction side wall of the airfoil, and terminating at a second link strip, wherein the first and second link strips are secured to each other and form a link portion of the main part, and wherein the main longitudinal portions are spaced apart so as to form a gap between said main longitudinal portions suitable for forming a hollow in the airfoil.

By means of this preform, it is possible to obtain a hollow vane that is particularly lightweight because of its hollow and because it is made of composite material.

In addition, because of this three-dimensional weaving, such a hollow vane possesses a one-piece structure that presents very good mechanical properties. Such a part is also of reduced anisotropy, thereby imparting great mechanical strength thereto regardless of the direction in which stresses are exerted. In particular, its three-dimensional network of fibers enables it to withstand shear forces without any risk of delamination, unlike co-sintered stacks of fabrics, for example.

By means of this preform, the method of fabricating such hollow vanes is also simplified. The method may include only one weaving step that is performed using a three-dimensional shuttle loom, which is nowadays well known in this field, thereby reducing the overall cost and the time needed for fabricating such a hollow vane. Where appropriate, it also makes it possible, during this single weaving step, to incorporate other elements of a set of vanes in the preform, such as platforms or fastener flanges that are then formed in one-piece manner with the hollow vane.

In addition, the preform presents a shape that is very close to that of the final vane, thus reducing the amount of machining needed for obtaining the final part. In particular, with such a preform, it is possible to obtain the final or almost final shape for the leading edge as from the weaving step, thereby limiting recourse to machining solely to the link portion that corresponds to the trailing edge. Furthermore, this procures good mechanical properties in this zone in particular by avoiding any singularities. Specifically, it should be observed that the leading edge zone is usually under greater stress than the trailing edge zone.

It is naturally also possible to imagine a preform in which the bend portion forms the final or almost final shape of the trailing edge, with machining being used solely for the leading edge.

The link strips preferably extend all along the upstream edges of their respective main longitudinal portions.

In the present description, the terms "longitudinal", "transverse", "bottom", "top", and derivatives thereof are defined relative to the main direction of the vanes; in addition, when referring to the preform, they are defined relative to the shaped preform; the terms "axial", "radial", "tangential", "inner", "outer", and their derivatives are defined relative to the main axis of the turbine engine; and finally, the terms "upstream" and "downstream", when they relate to the preform, are defined relative to the direction in which the preform is woven.

In certain embodiments, the first and second link strips are woven together in interlinked manner. In this way, the preform, and thus the resulting hollow vane, benefits from a three-dimensional network of fibers that cohere with one another, including in the link portion: this makes it possible to improve the mechanical strength of the link portion and thus of the leading edge or trailing edge of the resulting vane. In addition, a preform is thus obtained as a single piece as from the weaving step.

In certain embodiments, the U-turn bend portion is suitable essentially for forming a leading edge. The profile of a leading edge presents a radius of curvature that is relatively large and that is easy to obtain with a shuttle loom.

In certain embodiments, layers are crossed in the first and second link strips. This further improves the cohesion of the link portion.

In other embodiments, the first and second link strips are woven in non-interlinked manner and they are stitched together.

In other embodiments, the first and second link strips are woven in non-interlinked manner and they are bonded together by co-sintering.

In certain embodiments, the preform includes a second fiber structure obtained by weaving and configured to be fitted to an edge of the main fiber structure. This is useful in particular when a portion of the preform is situated downstream from the zone where the shuttle of the loom performs a U-turn movement and the portion can therefore not be woven together with the remainder of the preform during the same weaving step. This applies in particular to any portion situated downstream from the bend portion of the main part of the main fiber structure and intended for example to form parts of platforms or of fastener flanges.

In certain embodiments, the second fiber structure is obtained by three-dimensional weaving.

In other embodiments, the second fiber structure has one or more two-dimensional plies.

In certain embodiments, a second fiber structure is fitted to an edge of the main fiber structure by stitching.

In certain embodiments, a second fiber structure is fitted to an edge of the main fiber structure by co-sintering.

In certain embodiments, a second fiber structure is fitted to an edge of the main fiber structure by co-injection of a matrix.

In certain embodiments, at least one of the fiber structures comprises at least one radial portion extending from the bottom or top edge of one of the main longitudinal portions of the main part and suitable for forming a platform or a fastener flange. As mentioned above, this makes it possible to make a platform or a fastener flange in one-piece manner, and to do so during the same step as is used for making the hollow vane. The mechanical strength of the assembly, and in particular of the interface between the vane and the platform or the flange, is thus improved. In addition, this makes it possible to reduce the number of parts that are needed, in particular fasteners, thereby reducing the weight and the cost of the assembly.

In certain embodiments, said radial portion extends all along said bottom or top edge of said main longitudinal portion.

In certain embodiments, at least one of the fiber structures further includes at least one secondary longitudinal portion extending from an edge of said radial portion and suitable for forming a fastener flange.

In certain embodiments, at least one of the fiber structures includes an overlap portion that, when the fiber structure is flat, is situated upstream from at least part of the link portion of the main part, a gap being left between said overlap portion and the link portion. This gap may be cut in the fiber structures as they are obtained at the end of weaving. This makes it possible to make a platform portion or a flange portion that projects beyond the chord plane of the hollow vane. It is thus also possible to make overlap zones in which various sheets of fiber structures, once shaped, overlap one another, thus providing better cohesion and better strength for the complete platform or fastener flange as finally obtained.

In certain embodiments, the link portion of the main part possesses smaller width at its base and/or at its top than in its middle. A smaller width at the base or the top serves to limit the amount of machining that is needed in this zone of the part; this being sensitive because of the junction between the leading edge or the trailing edge of the vane with the platform. A larger width is in contrast possible in the middle between the link zones in order to obtain high strength, since this zone suffers fewer constraints.

In certain embodiments, the yarns used for weaving the preform are fibers of ceramic oxide, carbon, or carbide type, and preferably of alumina, mullite, silica, zirconia, silicon carbide, or a mixture thereof. Nevertheless, any other type of fiber might be used, for example glass fibers or Kevlar fibers.

In certain embodiments, the weave used for the three-dimensional weaving of the preform may be of the 3D interlock type, in particular in the link portion. Nevertheless, the weaving of the outer surfaces of the preform may be essentially two-dimensional, e.g. of the satin type.

The present description also relates to a hollow vane made as a single piece of composite material from a fiber preform in accordance with any of the above-described embodiments, said preform being shaped in a mold and embedded in a matrix.

In certain embodiments, the hollow vane is a turbine rear vane (TRV).

In other embodiments, the hollow vane is a nozzle vane. It may in particular be an outlet guide vane (OGV).

In certain embodiments, the matrix is of ceramic oxide or carbide type. It is preferably a matrix made of alumina, mullite, silica, zirconia, silicon carbide, or a mixture thereof. The matrix is preferably microporous. Nevertheless, it may also be a ceramic matrix based on boride or on nitride. It could equally be an organic matrix, e.g. of epoxy type.

The present description also relates to a turbine engine, including a hollow vane in accordance with any of the above embodiments.

The present description also relates to an aircraft, including a turbine engine as described above.

Finally, the present description provides a method of fabricating a hollow vane, the method including at least one step of weaving and cutting out a fiber preform in accordance with any one of the preceding embodiments.

The method makes it possible to obtain a blank having essentially the shape desired for the final part, possibly including platform or flange portions, with the exception of an upstream protuberance formed by the end of the link portion of the preform: this protuberance is then machined in order to obtain the leading edge or the trailing edge desired for the final part.

In certain implementations, the weaving step is performed using a three-dimensional loom having a bundle of warp yarns and at least one shuttle suitable for inserting a weft yarn between the warp yarns; the shuttle performs a succession of go-and-return movements starting from a link zone, traveling within a first main longitudinal zone, performing a U-turn in a bend zone, traveling within a second main longitudinal zone facing the first main longitudinal zone, and returning to the link zone, it being possible to perform each go-and-return movement in one direction or in the opposite direction; and the weft yarn(s) co-operate with the warp yarns to form a three-dimensional weave within the link zone, the first and second main longitudinal zones, and the bend zone. By using such a shuttle loom that makes it possible to perform such a method of weaving that includes U-turns, it is possible to obtain a hollow preform that presents only one link portion at one of its ends, its other end being woven directly with the desired shape.

In certain implementations, the method further comprises the following steps: cutting out the fiber preform; folding and shaping the fiber preform in a mold possessing the shape of the desired blank; placing an insert in the gap between the two main longitudinal portions; injecting and solidifying, preferably by drying, the matrix around the fiber preform in order to obtain the blank; removing the insert, sintering, and machining the link part of the blank corresponding to the link portion of the fiber preform in order to obtain the leading or trailing edge of the final part.

In certain implementations, the hollow vane is obtained from the preform using a method of the liquid composite molding (LCM) type as is known in the art. The liquid that is injected is thus either pre-ceramic polymers, possibly filled with powder, or sol-gels, also possibly filled with powder, or else suspensions, preferably a mixture of a powder, an organic binder, and a solvent.

In other implementations, the hollow vane is obtained from a preform using a method of the Polyflex type. In such a method, a fiber preform is put into position on tooling having a surface with the profile desired for the finished product. The preform is then covered by a flexible impermeable membrane and the matrix is injected between the membrane and the preform. On the other side of the membrane, isostatic pressure is exerted against the membrane by a fluid. The fluid forces the resin between the fibers and maintains the pressure during the stage while the matrix is drying.

In other implementations, when the preform includes a second fiber structure that is not secured with the main fiber structure prior to injection and solidification, the second fiber structure is positioned with the main fiber structure in the same mold, and the hollow vane is obtained from the preform with a co-injection type method.

In certain implementations, the step of machining the link part of the blank, corresponding to the link portion of the fiber preform, essentially comprises tapering down said link part to obtain the trailing edge.

In certain implementations, the method does not have a step of machining the bend portion of the blank corresponding to the bend portion of the preform.

The above-mentioned characteristics and advantages, and others, appear on reading the following detailed description of embodiments of the proposed preform and implementations of the proposed method. The detailed description refers to the accompanying drawings.

BRIEF DESCRIPTION OF THE DRAWINGS

The accompanying drawings are diagrammatic and seek above all to illustrate the principles of the invention.

DETAILED DESCRIPTION OF EMBODIMENTS

In order to make the invention more concrete, an example preform and an example method of fabrication are described in detail below with reference to the accompanying drawings. It should not be forgotten that the invention is not limited to these examples.

Figure 1:
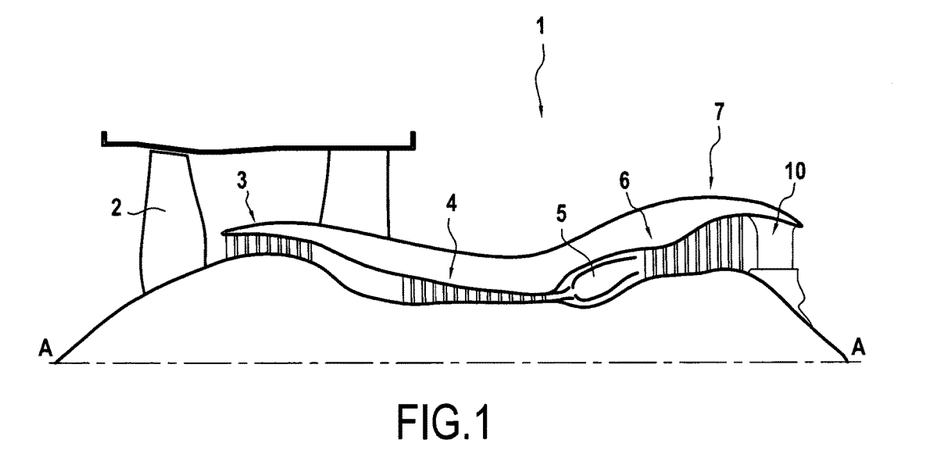
FIG. 1 is a section view of a turbine engine of the invention.

FIG. 1 is a view of a bypass turbojet 1 of the invention in section on a vertical plane containing its main axis A. From upstream to downstream in the flow direction of the air stream it comprises: a fan 2; a low pressure compressor 3; a high pressure compressor 4; a combustion chamber 5; a high pressure turbine 6; and a low pressure turbine 7. At its downstream end it also includes a set 10 of turbine rear guide vanes that is inserted in the primary air passage at the outlet from the low pressure turbine 7.

Figure 2:
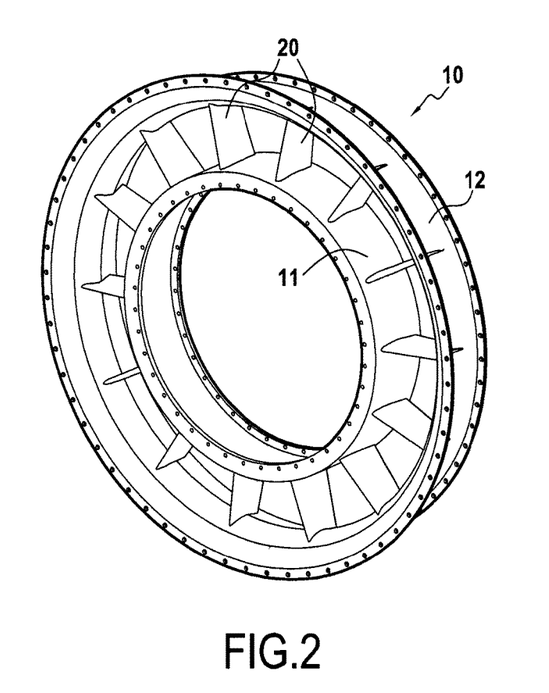
FIG. 2 is a perspective view of a set of turbine rear guide vanes.

FIG. 2 is a perspective view of such a set 10 of turbine rear guide vanes. This set comprises an inner hub 11 and an outer shroud 12 that are radially connected together by guide vanes 20, commonly referred to as TRVs.

Figure 11:
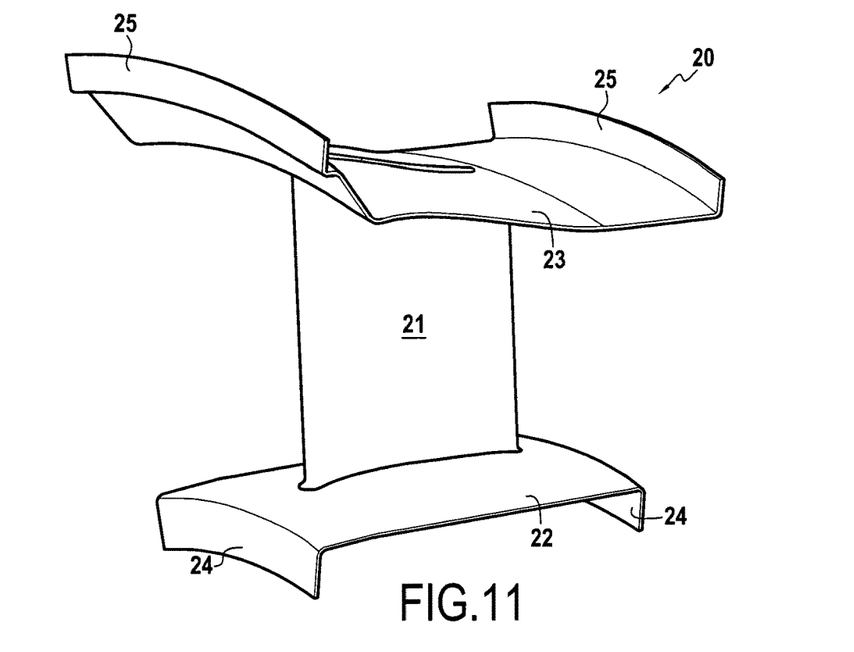
FIG. 11 is a perspective view of the final hollow vane obtained after machining the blank.

FIG. 11 is a perspective view of an example vane 20 of the present invention, specifically a TRV. Such a vane comprises an airfoil 21, a bottom platform 22, a top platform 23, and bottom and top fastener flanges 24 and 25. The airfoil portion 21 serves mainly to provide the aerodynamic function of the vane 20; the platforms 22 and 23 serve to constitute inner and outer walls for the air passage that are smooth and aerodynamic; the fastener flanges 24 and 25 serve to enable the vane 20 to be fastened to the inner hub 11 and to the outer shroud 12, respectively.

Figure 3:
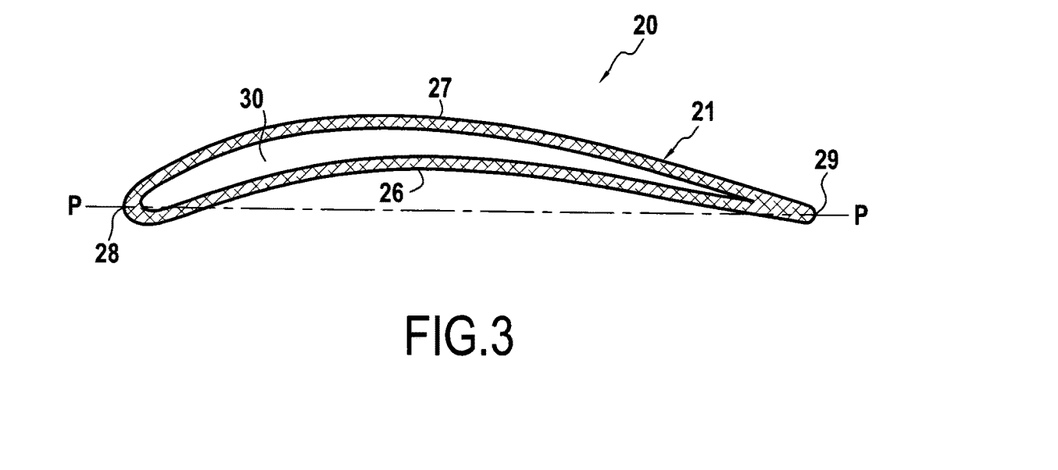
FIG. 3 is a section view of a hollow vane.

The airfoil 21 of such a TRV 20 is shown in section in FIG. 3. It comprises a pressure side wall 26 and a suction side wall 27 that are joined together at one end via a leading edge 28 and at the opposite end via a trailing edge 29: these pressure side and suction side walls 26 and 27 define an internal void 30 forming a vane hollow. In this example, the vane hollow 30 is to remain empty in order to reduce the weight of the guide vane set. Nevertheless, in other examples, in particular for other types of part, such a vane hollow could be used for passing services or a flow of air. It should also be observed that the leading edge 28 and the trailing edge 29 serve to define a chord plane P.

Figure 4:
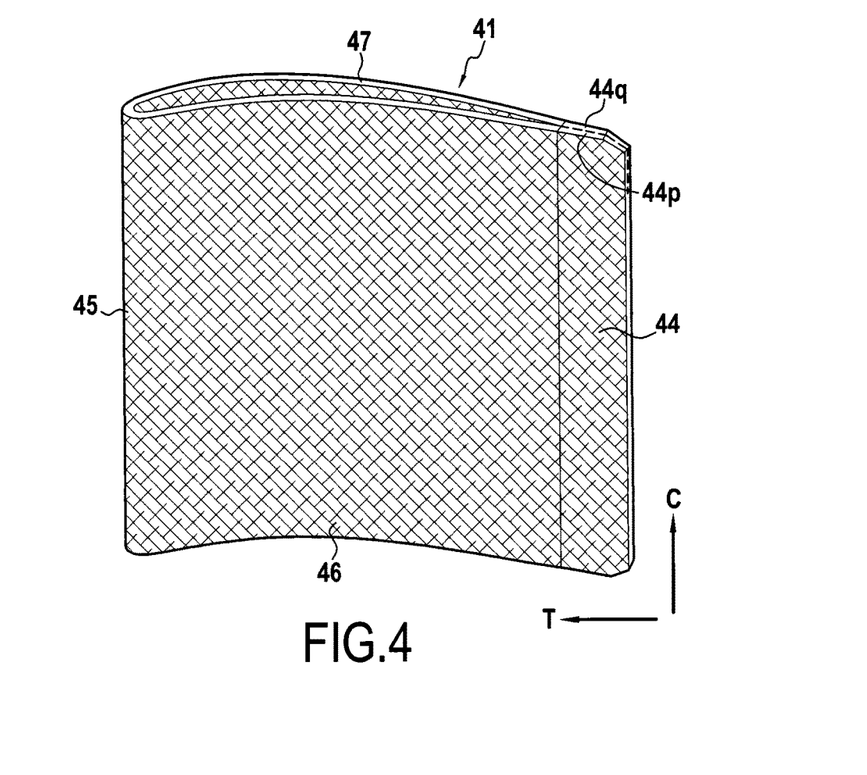
FIG. 4 is a perspective view of the main part of a first preform example.

FIG. 4 is a diagram showing the main part 41 of a fiber preform 40 once it has been woven, which preform serves to obtain such a vane 20. In these figures, the weft weaving direction is represented by arrow T, i.e. from right to left in the figures, while the warp direction is represented by arrow C. Nevertheless, it is possible to imagine configurations in which weaving is performed from the other end and in the opposite direction.

In this embodiment, the preform 40 is made by three-dimensionally weaving fibers of alumina in a 3D interlock weave.

This main part 41 of the preform 40 essentially comprises a fiber structure in the form of a loop comprising, one after another around the loop: a link portion 44, a first main longitudinal portion 46, a U-turn bend portion 45, and a second main longitudinal portion 47. It can thus be understood that the main longitudinal portions 46 and 47 serve to form the pressure side and suction side walls 26 and 27 of the airfoil 21, that the U-turn bend portion 45 serves to form the leading edge 28, and the link portion 44 is used for forming the trailing edge 29.

Figure 5:
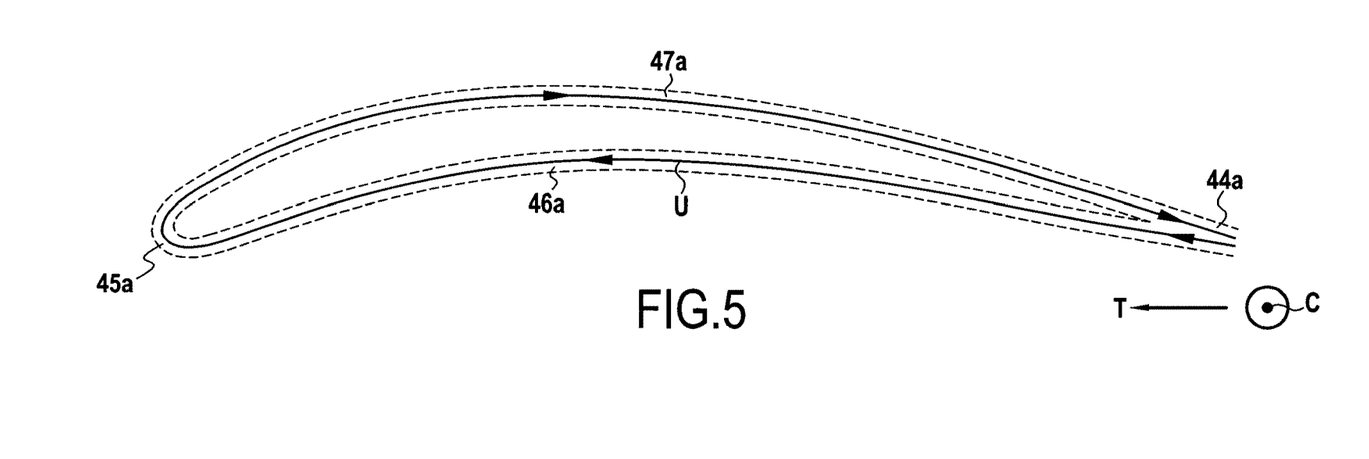
FIG. 5 is a diagram showing the weaving path for this main part of the preform.
Figure 6:
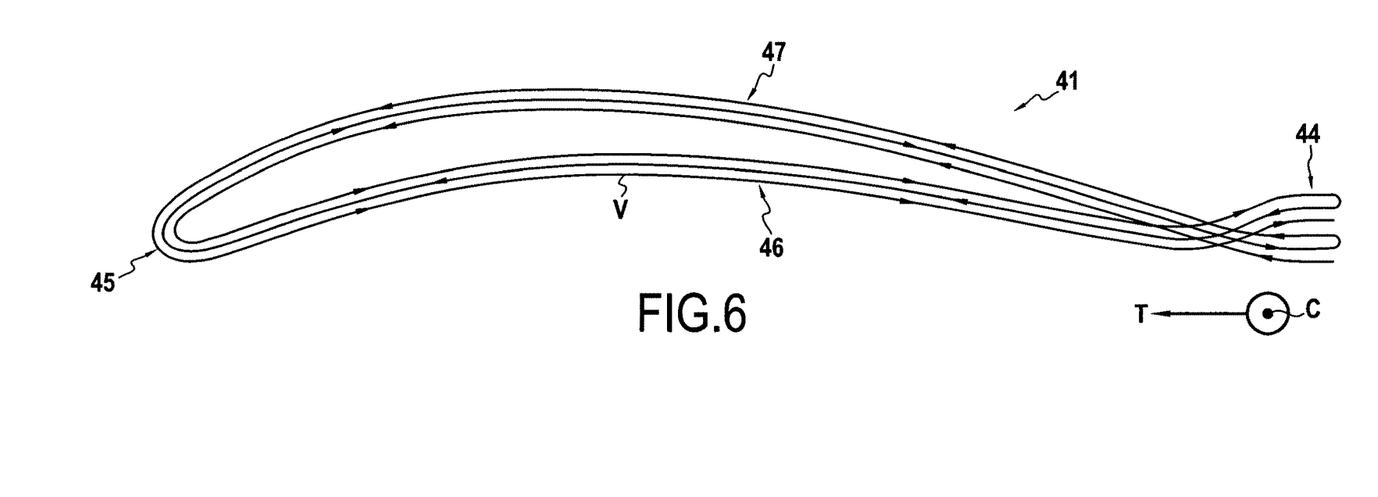
FIG. 6 shows an example weaving path for this main part.

FIGS. 5 and 6 serve to explain how this main part 41 of the preform 40 is woven. Such a preform may be woven on a three-dimensional loom having at least one shuttle pulling a weft yarn and capable of navigating freely between the warp yarns. In such a loop, the shuttle is directed so as to form a go-and-return path U between a said link zone 44a in which the link portion 44 is formed, and a said bend zone 45a in which the bend portion 45 is formed.

Thus, on each go-and-return movement, the shuttle starts from the link zone 44a, passes through a first main longitudinal zone 46a in which the first main longitudinal portion 46 is formed, then through the bend zone 45a where it performs a U-turn and returns to the link zone 44a by passing through the second main longitudinal zone 47a in which the second main longitudinal portion 47 is formed.

Each go-and-return movement U may be performed in the same direction or in opposite directions, i.e. alternating between traveling clockwise and traveling counterclockwise.

The succession of these go-and-return movements U serves to form a main part 41 of the preform 40 that has a given thickness of layers, which thickness is naturally greater in the link portion 44, given that the shuttle passes more frequently through the link zone 44a. For this purpose, it may be considered that the link portion 44 is made up of a first link strip 44p and a second link strip 44q lying one against the other and woven together in linked manner. Nevertheless, this is merely a mental concept, since there is no physical boundary that actually lies between these two strips, the link portion 44 as a whole forming a unit that is uniformly interlinked by a three-dimensional weave.

FIG. 6 shows an example of a path V that the shuttle may follow in order to make such a main part 41 of the preform 40. In this example, the shuttle travels three go-and-return movements alternating its travel direction on each occasion. It should also be observed that the shuttle causes layers at the junction between the link portion 44 and the main longitudinal portions 46 and 47 to cross. In this example, a main part 41 of the preform 40 is thus obtained having a thickness of three weft yarns and a thickness of six layers in its link portion 44.

It can naturally be understood that FIGS. 5 and 6 show the path followed by the shuttle in one given plane of the preform, however the preform is woven in analogous manner in the other plane of the preform so as to form three-dimensional weaves, and in particular weaves of the 3D interlock type, with the local positioning of the yarns nevertheless changing between each of the weave planes. Each weave plane may thus have its own shuttle, with the various planes of the preform then being woven in parallel; otherwise, in another configuration, a single shuttle weaves each plane in full one after another.

Thus, after a single weaving step, a main preform part 41 is obtained in a single piece that has a three-dimensional weave in each of its portions, including in its link portion, and that possesses a bend portion 45 of shape that, immediately after the weaving step, is appropriate for corresponding substantially to the shape desired for the leading edge.

Figure 7:
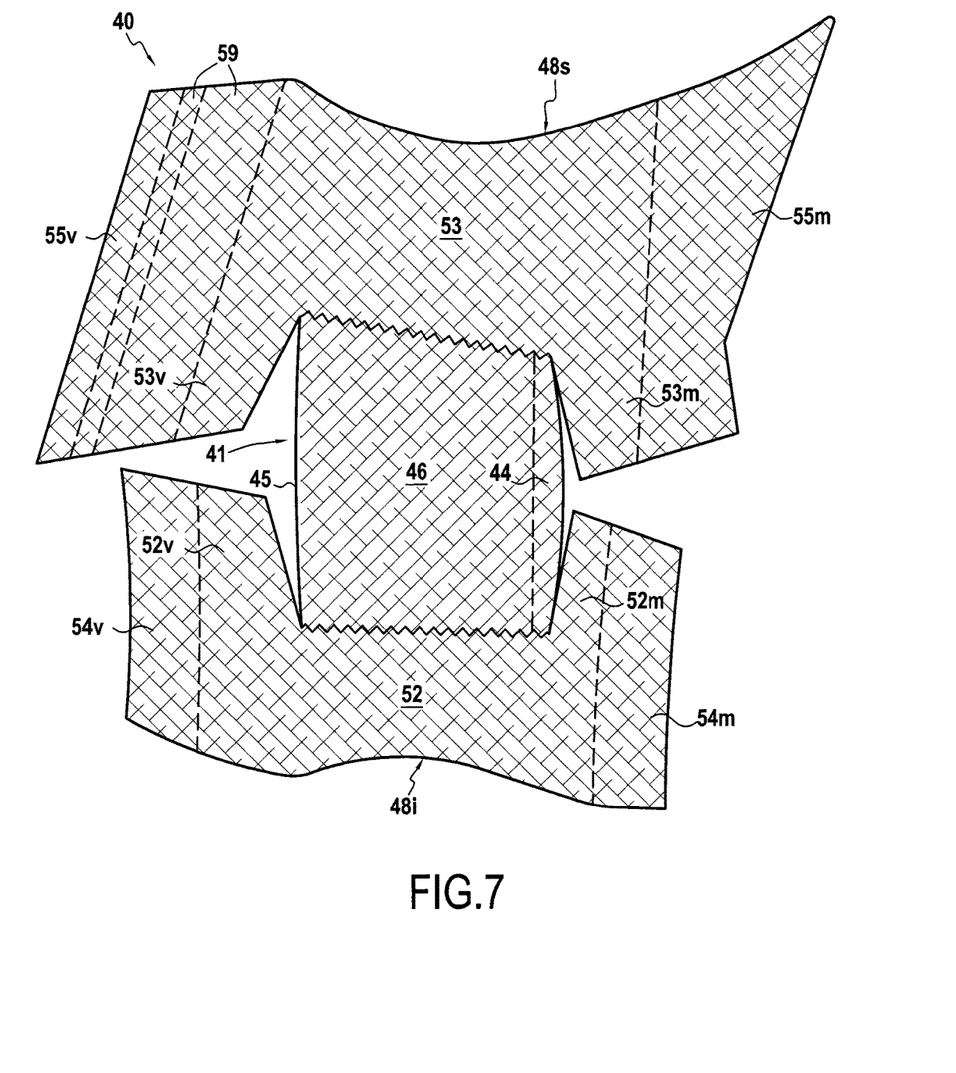
FIG. 7 is a view of a part of the first example preform when flat.
Figure 8:
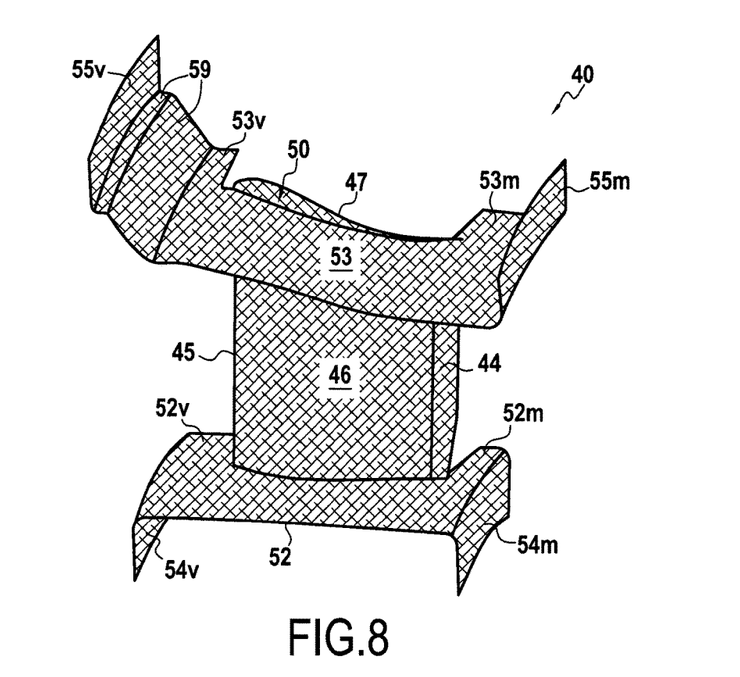
FIG. 8 shows the same preform after it has been shaped.

FIG. 7 shows part of the preform 40 laid out flat after being cut out. FIG. 8 shows the same preform 40 after it has been shaped. In these figures, for reasons of readability, only the front sheets of the preform 40 as cut out are shown: it should nevertheless be remembered that the preform 40 has other sheets that lie behind the sheets that are shown and that possess shapes that are substantially analogous.

In the preform 40, there can be seen the main part 41 with its first main longitudinal portion 46 between the link portion 44 and the bend portion 45 that extend respective all along the upstream and downstream ends of the first main longitudinal portion 46.

The preform 40 also has a top front sheet 48s and a bottom front sheet 48i that are woven independently and that are fitted respectively to the top edge and to the bottom edge of the main part 41, essentially via the first main longitudinal portion 46. In this example, these secondary fiber structures 48s and 48i are secured to the main part 41 by stitching. It would also be possible to place these sheets in a mold and to secure them to the main part by co-injection followed by sintering.

The bottom front sheet 48i has a portion 52 referred to as the bottom radial portion that extends from the bottom edge of the main longitudinal portion 46 to the bottom edge of the preform 40. This bottom radial portion 52 also has an upstream overlap portion 52m that goes around and extends in part upstream of the link portion 44. The bottom radial portion 52 also has a downstream overlap portion 52v that passes around and extends in part downstream from the bend portion 45.

While the preform 40 is being shaped, this radial portion 52 is folded into a radial position so as to form the pressure side portion of the bottom platform 22.

This radial portion 52 is also extended upstream by an upstream secondary longitudinal portion 54m and downstream by a downstream secondary longitudinal portion 54v. These portions are suitable for being folded longitudinally so as to form the bottom fastener flanges 24.

In analogous manner, the top front sheet 48s has a portion 53 referred to as the top radial portion that extends from the top edge of the main longitudinal portion 46 to the top edge of the preform 40. This top radial portion 53 has upstream and downstream overlap portions 53m and 53v. This top radial portion 53 is suitable for being folded into a radial position so as to form the pressure side part of the top platform 23.

This top radial portion 53 is also extended downstream by a succession of intermediate portions 59 leading to a downstream secondary longitudinal portion 55v, and upstream by an upstream secondary longitudinal portion 55m. These portions are suitable for being folded longitudinally so as to form the top fastener flanges 25.

The preform 40 may be moistened in order to soften it and make it easier to move the fibers out of register. It is then inserted into a forming mold having its inside space matching the shape desired for the preform 40.

Figure 9:
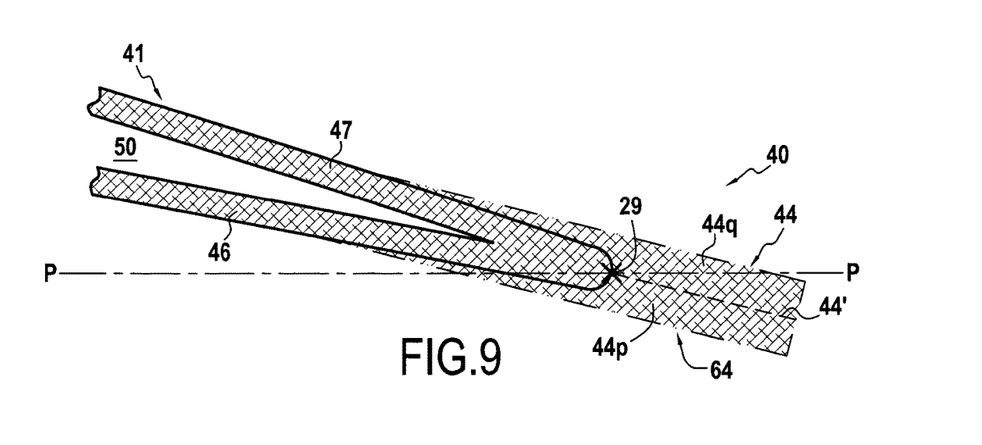
FIG. 9 is a detail view of the trailing edge of the preform after shaping.

The shaping of the trailing edge of the preform 40 is described in greater detail with reference to FIG. 9. This figure shows in superposition the shape of the preform 40 in dashed lines and the shape of the final part 20 in bold lines. During shaping, the main longitudinal portions 46 and 47 are spaced apart from each other so as to leave a gap 50. An insert is then inserted into the gap 50 so that the matrix does not fill it during injection and setting, thus making it possible to obtain the hollow 30 in the airfoil.

At the trailing edge 29, the main longitudinal portions 46 and 47 converge in regular manner towards the link portion 44. Shaping is performed in such a manner that the trailing edge 29 of the final part 20 lies on the midplane 44' of the link portion 44.

Once shaping has been performed with the help of the forming mold, the preform 40 is dried so that it stiffens, thus holding it in the shape imposed during shaping. The preform 40 is then placed in an injection mold having the dimensions of the desired vane blank 60 and a matrix is injected into the mold, specifically a porous alumina matrix. By way of example, such injection may be performed by the LCM method. At the end of this step, after drying and removal of the insert, a vane blank 60 is obtained that is made of composite material comprising a preform 40 woven using alumina fibers and embedded in an alumina matrix.

Figure 10:
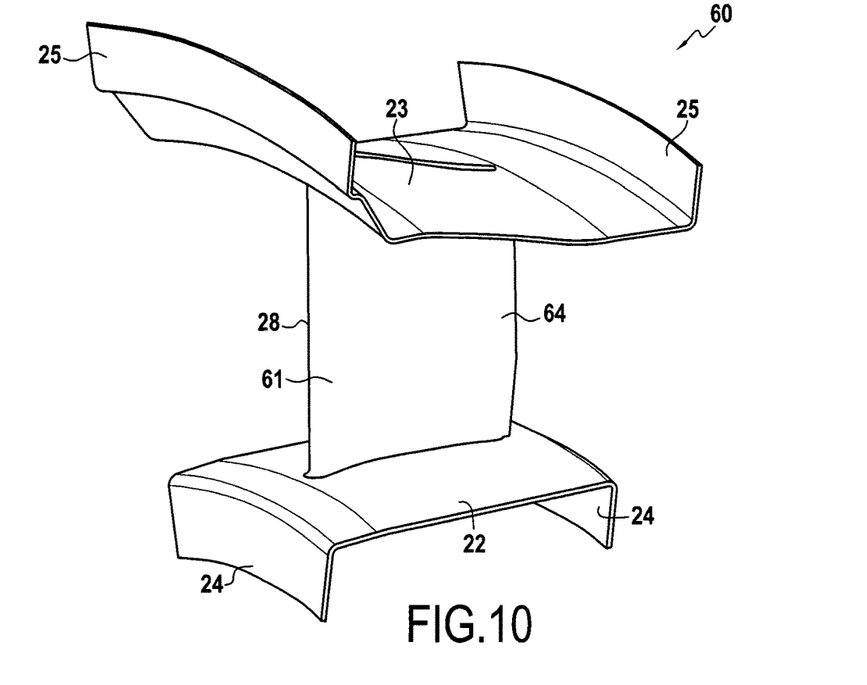
FIG. 10 is a perspective view of the blank obtained from the preform

In FIG. 10, it can be seen that the vane blank 60 already has the leading edge 28, the platforms 22 and 23, and the fastener flanges 24 and 25 as desired. In contrast, the airfoil 61 of the blank 60 possesses a protuberance 64 resulting from the distal end of the link part derived from the link portion 44. This protuberance, which is also visible in FIG. 9, needs to be machined away in order to obtain the final vane 21. The machining includes cutting off the protuberance 64 and tapering down the trailing edge on either side of the midplane 44' of the link portion 44.

In order to facilitate machining of the junctions between the airfoil 21 and the platforms 22 and 23 and in order to avoid weakening the structure of the vane in so doing, the link portion 44 possesses small width, equal to about 5 millimeters (mm) at its top and bottom ends; in the middle of the airfoil 21, its width is greater, being equal to about 10 mm.

Other finishing steps, in particular machining steps, may possibly be used in addition in order to finish off the vane 20.

Figure 12:
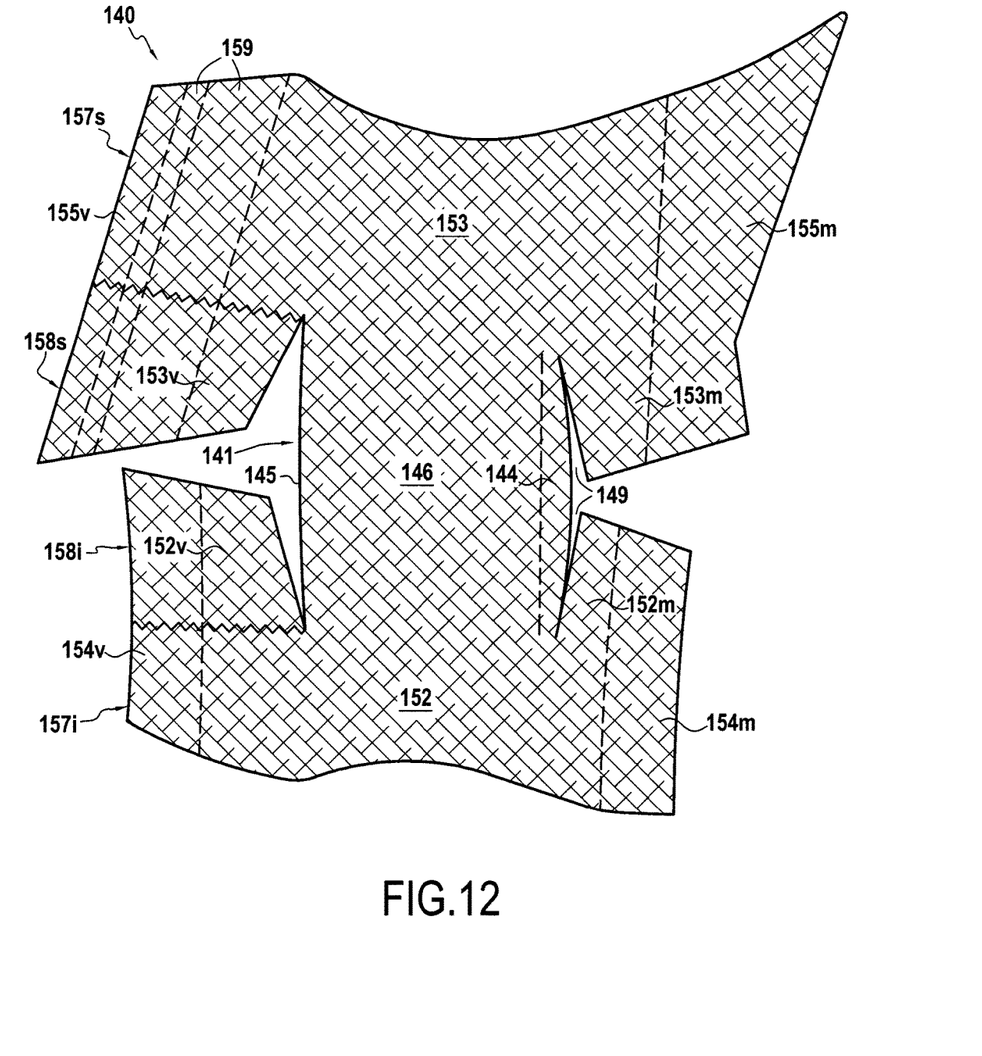
FIG. 12 is a view of a part of a second example preform when flat.

FIG. 12 shows another example preform 140 in which large portions of the top and bottom front sheets 48s and 48i of the above-described example are woven simultaneously with the main part 141 of the preform during a common weaving step.

The need to cause the shuttle to perform a U-turn in the bend zone in order to make a suitable shape for the leading edge during the weaving step means that it is not possible during the same step to weave portions of the preform that are located strictly downstream from the bend zone. Nevertheless, above and beneath this bend zone, the shuttle is free to perform its U-turn further downstream in order to weave a larger portion of the top and bottom sheets during the same step.

Thus, in this second example, the main weaving step ends up forming a main fiber structure as a single piece comprising a main part 141 with its first and second main longitudinal portions 146 between the link portion 144 and the bend portion 145, a bottom radial portion 152, a top radial portion 153, and upstream secondary longitudinal portions 154m and 155m that are analogous to the portions of the same types in the first example.

The main fiber structure of the preform 140 also has bottom and top downstream portions 157i and 157s that extend downstream from the bend portion 145, respectively downstream and above it. It should be recalled that only the front sheets are shown in FIG. 12, but it should be observed that the rear sheets could likewise include such portions, in which case the shuttle may for example weave the front portions on its go path and the rear portions on its return path.

Bottom and top downstream sheets 158i and 158s are also woven separately and secured, by stitching, to the top edges of the bottom downstream portions 157i and the bottom edges of the top downstream portions 157s, respectively. Because of these added-on fiber structures, the preform 140 has downstream secondary longitudinal portions 154v and 155v that are analogous to those in the first example.

It should also be observed that the main fiber structure of the preform 140 also includes upstream overlap portions 152m and 153m that go round the link portion 144, respectively from below and from above, and that extend in part upstream therefrom, with a gap 149 that is cut out in the fiber structure separating these overlap portions 152m and 153m from the link portion 144. The cutting that forms the gap 149 may be performed in particular by a jet of water under pressure or by a laser beam.

The embodiments or implementations described in the present description are given by way of non-limiting illustration, it being easy for a person skilled in the art to modify these embodiments and implementations or to envisage others in the light of this description, and while remaining within the ambit of the invention.

Furthermore, the various characteristics of these embodiments or implementations may be used on their own or in combination with one another. When they are combined, these characteristics may be combined as described above or in other ways, the invention not being limited to the specific combinations described in the present description. In particular, unless specified to the contrary, a characteristic described with reference to one particular embodiment or implementation may be applied in analogous manner to some other embodiment or implementation.

The invention claimed is:

1. A fiber preform for a hollow turbine engine vane, the preform comprising:
   a main fiber structure obtained by three-dimensional weaving and including a main part extending in a radial direction; and
   a second fiber structure obtained by weaving and configured to be fitted to an edge of the main fiber structure,
   wherein the main part presents a loop and includes, in order around the loop:
      a first link strip,
      a first main longitudinal portion suitable for forming essentially a pressure side wall of an airfoil,
      a U-turn bend portion suitable for forming essentially a leading edge or a trailing edge of the airfoil,
      a second main longitudinal portion facing the first main longitudinal portion and suitable for forming essentially a suction side wall of the airfoil, and
      a second link strip,
   wherein the first and second link strips are secured to each other and form a link portion of the main fiber structure,
   wherein the main longitudinal portions are spaced apart so as to form a gap between said main longitudinal portions suitable for forming a hollow in the airfoil, and
   wherein at least one of the fiber structures comprises a radial portion extending from a bottom edge or a top edge of the first main longitudinal portion or the second main longitudinal portion of the main part, the radial portion being suitable for forming a platform or a fastener flange.

2. The fiber preform according to claim 1, wherein the first and second link strips are woven together in interlinked manner.

3. The fiber preform according to claim 1, wherein at least one of the fiber structures includes an overlap portion that, when the fiber preform is flat, is situated upstream from at least part of the link portion of the main part, a gap being left between said overlap portion and the link portion.

4. The fiber preform according to claim 1, wherein at least one of a radially bottom end or a radially top end of the link portion of the main part presents a smaller width in a direction perpendicular to the radial direction than a middle of the link portion of the main part in the radial direction.

5. A hollow vane comprising a single piece of composite material from a fiber preform according to claim 1, said preform being shaped in a mold and embedded in a matrix.

6. The hollow vane according to claim 5, wherein the fiber preform is made with fibers of ceramic oxide, carbon, or carbide type.

7. The hollow vane according to claim 6, wherein the fiber preform is made with fibers of alumina, mullite, silica, zirconia, silicon carbide, or a mixture thereof.

8. The hollow vane according to claim 5, wherein the matrix is of ceramic oxide, carbide, or nitride type, or is organic of epoxy type.

9. The hollow vane according to claim 8, wherein the matrix is made of alumina, mullite, silica, zirconia, silicon nitride or carbide, or a mixture thereof.

10. A turbine engine, comprising a hollow vane according to claim 5.

11. A method of fabricating a hollow vane, the method including weaving a fiber preform according to claim 1.

12. The method according to claim 11, wherein the weaving is performed using a three-dimensional loom having a bundle of warp yarns and at least one shuttle suitable for inserting a weft yarn between the warp yarns;

wherein the shuttle performs a succession of go-and-return movements in a first direction or a second direction, the first direction starting from a link zone, traveling within a first main longitudinal zone, performing a U-turn in a bend zone, traveling within a second main longitudinal zone facing the first main longitudinal zone, and returning to the link zone, the second direction being opposite the first direction; and wherein the weft yarn cooperates with the warp yarns to form a three-dimensional weave within the link zone, the first and second main longitudinal zones, and the bend zone.

13. The method according to claim 11, further comprising:
    cutting out the fiber preform;
    folding and shaping the fiber preform in a mold possessing the shape of a desired blank;
    placing an insert in the gap between the two main longitudinal portions;
    injecting and solidifying the matrix around the fiber preform in order to obtain the blank;
    removing the insert; and
    machining the link part of the blank corresponding to the link portion of the fiber preform in order to obtain the leading or trailing edge of the final part.

14. The method according to claim 13, wherein the machining the link part of the blank, corresponding to the link portion of the fiber preform, comprises tapering down said link part to obtain the trailing edge.

\* \* \* \* \*